United States Patent [19]

Jacobone

[11] 4,246,319
[45] Jan. 20, 1981

[54] COATINGS FOR POLYOLEFINIC PRODUCTS AND PRODUCTS COVERED BY SAID COATINGS

[75] Inventor: Donato Jacobone, Milan, Italy

[73] Assignee: Frypan S.p.A., Italy

[21] Appl. No.: 1,408

[22] Filed: Jan. 8, 1979

[30] Foreign Application Priority Data

Jan. 16, 1978 [IT] Italy .................................. 19268 A/78

[51] Int. Cl.$^3$ ...................... B32B 27/32; B32B 27/36; B32B 27/38; B32B 27/30

[52] U.S. Cl. .................................. 428/413; 427/412.3; 428/483; 428/516; 428/520; 428/523; 525/107; 525/109; 525/119

[58] Field of Search ....................... 525/119, 107, 109; 428/483, 413, 414, 516, 520, 480, 522, 523; 427/407 E, 412.3

[56] References Cited

U.S. PATENT DOCUMENTS

| | | | |
|---|---|---|---|
| B 463,591 | 3/1976 | Offermann et al. | 428/483 X |
| 2,829,068 | 4/1958 | Stewart | 428/483 |
| 2,876,067 | 3/1959 | Nagel et al. | 428/483 X |
| 3,018,197 | 1/1962 | Covington et al. | 428/413 |
| 3,293,111 | 12/1966 | McCormick | 428/414 |
| 4,121,016 | 10/1978 | Garrison | 428/483 |
| 4,160,178 | 7/1979 | Smith et al. | 428/480 X |
| 4,169,732 | 10/1979 | Shipley | 428/413 X |

*Primary Examiner*—Harold Ansher
*Attorney, Agent, or Firm*—McGlew & Tuttle

[57] ABSTRACT

A coating composition for polyolefinic films, especially polypropylene films, which consists essentially of a solution of a three-component polymeric system comprising:

(a) about 50 to 80% of saturated polyesters, unsaturated polyesters or mixtures thereof;

(b) polymers and copolymers of acrylic esters; and (c) epoxy resins, the ratio of each of components (b) and (c) being from about 1 to 49% and being selected as to make up the total percentage of the polymeric system.

The coated products and the coating process are also covered.

2 Claims, No Drawings

COATINGS FOR POLYOLEFINIC PRODUCTS AND PRODUCTS COVERED BY SAID COATNGS

BACKGROUND OF THE INVENTION

The present invention relates to new coatings for polyolefinic films, particularly but not exclusively, for polypropylene films and further relates to films and the like covered by said coatings, especially for rendering said films thermosealable by conventional packaging and sealing machines.

Polyolefinic films in general, and isotactic polypropylene films in particular, have experienced in the recent years a notable development especially in the field of sealed bag packaging and in general in the automatized packaging field.

The present films have been used in particular as replacement of the regenerated cellulose films, generally known as "Cellophane" films, as alternates but also often as substitutes to thin polyvinylchloride films with respect to which they offer numerous advantages.

Cellophane, as is well known, has been up to few years ago one of the most widely used materials in the field of flexible packaging for the food industry.

Often, in order to improve cellophane performance, it is necessary to treat the film with thermoplastic resins which serve to improve the sealability of two or more films with each other in a packaging machine. But, above all, said coatings served to form an effective barrier for gases and water vapor to which all cellulose derivatives are particularly sensitive. The above-described treatment is easily effected utilizing well knows systems of coating or the like, using for example coatings of the following compositions:

"Saran"—PVDC (dispersion or solution) and its copolymers
PVC (dispersion or solution) and its copolymers
Nitrocellulose (with various resins)

The application of the coatings described does not present any particular difficulties due to the very good thermal properties of the regenerated cellulose.

Plastic films, in general, and in particular mono- or bi-oriented (biaxially drawn) polypropylene films, even though possessing better physico-mechanical characteristics than cellophane, are very sensitive to temperatures higher than 110° C. and are less stable thermally than cellophane.

Consequently they are more difficult to heat-seal, requiring special apparatus.

Therefore, the coating of said polypropylene films must, above all, eliminate their thermosealability deficiencies and thus permit the sealing thereof at temperatures lower than those at which the polypropylene may undergo the adverse effects of rippling, tightening, melting, degradations and the like.

To achieve this result, the polypropylene film (hereinafter referred to as "PP films") are coated using procedures similar to those used for cellophane but modified and improved to account for the different behavior of the material being treated. Among the materials most widely used for the coating of said films are vinyl resins and their copolymers, vinylicid resins and their copolymers, acrylic resins and their copolymers or mixtures of the above resins in varying proportions. The above resins are applied onto the PP film either as solutions in a suitable solvent or as emulsions.

The major difficulty in coating the PP base film consists in obtaining a good adhesion of the coating to the base film. In fact, a routing coating operation could result in very low sealability values due to the delamination of the coating. In order to increase the mechanical resistance of the seals, there are certain treatments to which the film is subjected to before the coating operation. The precoating treatments known at this time are: electric discharge treatment (corona effect), flame treatment, treatment with oxidizing solutions (impractical because of processing difficulties) and, finally treatment with a suitable primer, preferably effected in conjunction with the above-mentioned surface treatments.

The flame or corona treatments are easily performed and have a definite effect in improving the wettability properties of the base film. Among the primers, the better and most practical, and consequently the one most often used, is a water-soluble polyimine compound, used for some time in the paper industry and in the manufacturing industry (in the production of flexible plastic film articles consisting of combinations of plastic film with aluminum, paper and cellophane).

The technique of the above-mentioned technologies have already been used in the field of isotactic polyethylene films and there exist, in this regard, some patents to various companies in this field. Among these, an Italian patent to Montecatini discloses a process (Italian Pat. No. 717,612, filed on Mar. 16, 1964) for obtaining coated films (called "Moplefan") consisting substantially of a base film of polypropylene high in isotatic content. Said base film is subjected to a flame treatment and to a corona discharge treatment as above described. After said treatment, a polyimine based primer is applied on the base film. The treated film is then covered with a coating consisting of a mixture of, substantially, three basic components. In the patent there is claimed the effect of the oxiranic group contained in the epoxy resin in improving the adhesion of the coating to the support base. There are also known other commercial products such as "Prophan" having thermosealability characteristics similar to those of Moplefan.

There also exist alternate processes which utilize different technologies such as coupling and lamination of thin film, which also require the use of primers, adhesives and/or hot melts for the coupling of said films with a previously extruded film or with a molten layer. Also in this case, the effectiveness of polyimine as an adhesion promoter is known.

It is also important that the product, in addition to the thermosealability characteristics, must also have other characteristics such as: good optical transparency, no tackiness above 45°/60° C., stability to aging, cohesion of the sealed film immediately after the opening of the sealing bars, easy separation from the sealing bars, minimum value of friction coefficient, low solvent retention, resistance to greases and fats, good printability, impermeability to gases, etc. Furthermore, in applications in the food packaging field, said films must comply with the existing norms in the field. In view of these facts, in the resin compositions there exist, for each type of base formulation, modifiers and additives which must be dosed and chosen as to optimize the distribution of values of the characteristics required for each specific application.

DESCRIPTION OF THE INVENTION

Taking into consideration all these implications, applicant has studied and developed a resin mixture for coating purposes, alternate to that described in the Moplefan patent (Italian Pat. No. 717,612 filed Mar. 16, 1964), said mixture being characterized by the fact that one of its main components is a polymer of the saturated and/or unsaturated polyester type. In particular, said mixture is characterized by the fact it provides the following three component base composition: polymers of the saturated and/or unsaturated polyester type as hereinafter described, polymers and copolymers of acrylic ester, epoxy resins obtained by the condensation of bisphenol A and epichlorohydrin.

The products according to the present invention, particularly mono-, bi- and non-oriented polypropylene films coated according to the present invention are substantially characterized by the fact of providing a first layer of preparation or of adhesion (primer layer) to which is subsequently applied the actual coating. Said two covering layers are essentially composed of (all the percentages being indicated on a weight percentage based on the dry mixture, unless other-wise indicated):

(1) Primer layer—composed of alkyleneimine polymers, such as polyethyleneimine, polypropyleneimine or the like.

(2) Coating layer—composed of polyester-type polymers obtained by the esterification of phthalic, terephthalic, isophthalic acid or phthalic anhydride with aliphatic glycols having 2 to 8 carbon atoms, with glycol ethylenic ethers, such as diethylene or triethylene glycol, or with variable mixtures, in the range of 95/5 to 5/95, of the above hydroxy compounds; or composed of esterification products of phthalic, terephthalic or isophthalic acid or of phthalic anhydride with alcohols containing three or more primary or secondary hydroxy groups (such as trimethylolethane, trimethylolpropane, pentaerythritol, neopentylglycol, hexanetriol).

The hydroxy groups of the aforementioned alcohols may be partially esterified (defunctionalized) with monocarboxylic acids (such as benzoic acid, para-t-butyl-benzoic acid, saturated fatty acids, unsaturated fatty acids, hemiesters of bifunctional acids); or composed of the esterification products of dibasic aliphatic acids having a $C_2$–$C_9$ chain with the various types of glycols and polyhydroxy alcohols described above; or composed of the esterification products of the aromatic and aliphatic acids set forth above, alone or in combination with each other in a ratio between 95 to 5 and 5 to 95, with the glycols and polyhydroxy alcohols above indicated; composed of the esterification products of the aromatic and aliphatic acids set forth above, alone or in combination with each other in a ratio of 95 to 5 and 5 to 95, with bi- and poly-functional alcohols and, combined therewith, with aminoalcohols (such as triethanolamine); or composed of the esterification products of the aromatic and aliphatic acids above described, alone or in combination with each other in a ratio between 95 to 5 and 5 to 95, substituting totally or partially the aliphatic or aromatic dibasic acids with aromatic or aliphatic isocyanates or isocyanate derivatives, such as taluene-diisocyanate; or composed of the transesterification product of the methyl ester of the dibasic acids with the bi- or poly-functional alcohols set forth above; or composed of the esterification products of dibasic aliphatic or aromatic acids with ethylene or propylene oxide; or composed of the transesterification product of aliphatic and aromatic dibasic acid chlorides with bi- or poly-functional alcohols, after the separation of sodium chloride as a heterogeneous phase; or composed of the esterification product of dibasic aliphatic or aromatic acids or their bromide derivatives with glycols or polyalcohols; or composed of the esterification product of dibasic acids with chlorinated or brominated glycols or polyglyols.

To better the characteristics of the coatings, in the coating mixture there are added to the polyesters other types of polymers such as, for example:

(a) homopolymers and copolymers of acrylic, methacrylic, crotonic and itaconic acid, and their related aliphatic esters having 1 to 14 carbon atoms, and corresponding isomers, or hydroxyalkyl esters of said acids containing from 2 to 12 carbon atoms and having the hydroxy group a primary or secondary carbon atom;

(b) Epoxy resins obtained by the condensation of bisphenol A and epichlorohydrin or methylepichlorohydrin, or epoxidated novolac-type polymers containing the oxiranic bridge obtained by the addition of epichlorohydrin or methylepichlorohydrin on the functional OH acid group of the phenolic resins (novolac-type);

(c) Low or medium viscosity nitrocellulose;

(d) Coumarin or hydrocarburic resins;

(e) Phenolic, alkylphenolic or terpenphenolic resins; and (f) Carbaminic resins.

For this application the resin mixture is solubilized in suitable solvents, such as ketones, ethyleneglycol ethers, or acetic acid esters, in concentrations between 20 and 40% of the dry components.

The coating formulation thus prepared can be further modified by the addition of suitable agents, such as release, antistatic and welting agents, pigments and fillers, in order to obtain the desired properties for the particular use.

There now follow the illustrative examples:

EXAMPLE 1

There is prepared a glass reactor equipped with a stirrer, a thermometer for temperature control and a reflux condenser with a splitting head to remove the water produced in the reaction.

To the reactor there are charged:
Phthalic anhydride    1.0 mol
Maleic anhydride      1.5 mol
Propylene glycol      3.2 mol The components are reacted for a period of 6-8 hours at a temperature of 210° C. until the reaction mixture reaches the desired final values:
acidity number (DIN 53402)=50±5 mg KOH/g
melting point (DIN 53181)=45°±5° C.

EXAMPLE 2

Film base: polypropylene film having a high isotactic polymeric content, treated on the surface by electronic and/or flame means, as to obtain a minimum wettability value of 36 dynes/cm.

Precoat: one of the two faces of the film is coated with an aqueous solution of polyimine (1–2% on a dry basis).

Coating: the applied layer is dried and is subsequently treated with a coating solution (polymer content of 20–35% in methylethyl-ketone). Said coating solution is composed of the following types of polymers:

(1) A polyester solution from Ex. 1 (60 parts)
(2) An acrylic copolymer solution (30 parts)
(3) An epoxy resin solution (10 parts).

The above solutions are admixed in methylethylketone (20% on a dry basis) at ambient temperature.

Characteristics: after the coating and drying operations (the drying being effected at 90° C.), the coated film has the following characteristics:
coating thickness = 2-3μ
adhesion (Scotch tape test) = good
transparency (Haze) = 1.5-2%
resistance to sealing = 300-350 g/cm
(sealing conditions: t = 120° C.; sealing time = 2 seconds; pressure of sealing bars = 40 psi).

EXAMPLE 3

Film base: polypropylene film having a high isotactic polymeric content, treated on the surface by electronic and/or flame means, as to obtain a minimum wettability value of 35 dynes/cm.
Precoat: one of the two faces of the film is coated with an aqueous solution of polyimine (1-2% on a dry basis).
Coating: the layer thus applied is dried and is then treated with a coating solution (20-35% polymer content in a methylethylketone solvent). Said coating solution is composed of the following polymeric components:
(1) Polyester solution (50 parts)
(2) Acrylic copolymer solution (30 parts)
(3) Medium viscosity solution of nitrocellulose (20 parts).

The above solutions are admixed in methylethylketone (20% on a dry basis) at ambient temperature.
Characteristics: after the coating and drying operations (the drying effected at 90° C.) the coated film has the following characteristics:
coating thickness = 2-3μ
transparency (Haze) = 1.5-2%
adhesion of the sealing bar = <100 g/cm.

What is claimed is:
1. As new industrial products, polyolefinic films coated with a composition consisting essentially of a solution of a dry polymeric system comprising:
   (a) about 50 to 80 parts by weight of a first component selected from the group consisting of saturated polyesters, unsaturated polyesters and mixtures thereof;
   (b) a second component selected from the group consisting of polymers and copolymers of acrylic esters; and
   (c) a third component consisting of an epoxy resin;
the second and third components being of about 1 to 49% parts by weight of the system and being selected so as to make up the balance of the total percentage of the dry polymeric system.
2. The new industrial products of claim 1 wherein the polyolefinic films are polypropylene films.

* * * * *